United States Patent [19]
Fleming et al.

[11] Patent Number: 5,877,677
[45] Date of Patent: Mar. 2, 1999

[54] CONTROL OF AIR BAG ACTIVATION IN VEHICLES BY OCCUPANCY WEIGHT

[75] Inventors: Joseph A. Fleming; Jo A. Fleming; Lawrence E. Fleming, all of Catalina, Ariz.

[73] Assignee: Christopher Shoulders, L.L.C., Collinsville, Ill.

[21] Appl. No.: 754,863

[22] Filed: Nov. 22, 1996

[51] Int. Cl.$^6$ ........................................ B60Q 1/00
[52] U.S. Cl. .................... 340/436; 340/666; 340/667; 280/734; 280/735; 180/282
[58] Field of Search ................... 340/436, 438, 340/666, 667, 426; 180/282, 273; 280/734, 735

[56] References Cited

U.S. PATENT DOCUMENTS

| | | | |
|---|---|---|---|
| 3,672,699 | 6/1972 | De Windt | 280/735 |
| 3,777,175 | 12/1973 | Lewis et al. | 340/666 |
| 4,678,058 | 7/1987 | Wooters | 180/273 |
| 4,824,180 | 4/1989 | Levrai | 303/22.5 |
| 5,232,243 | 8/1993 | Blackburn et al. | 280/732 |
| 5,413,378 | 5/1995 | Steffens, Jr. et al. | 280/735 |
| 5,454,591 | 10/1995 | Mazur et al. | 280/735 |
| 5,474,327 | 12/1995 | Schousek | 280/735 |
| 5,570,903 | 11/1996 | Meister et al. | 280/735 |
| 5,618,056 | 4/1997 | Schoos et al. | 280/735 |
| 5,639,117 | 6/1997 | Mandzy et al. | 280/741 |

OTHER PUBLICATIONS

Description of existing equipment as known by inventors.

*Primary Examiner*—Jeffery A. Hofsass
*Assistant Examiner*—Julie B. Lieu
*Attorney, Agent, or Firm*—Banner & Witcoff, Ltd

[57] ABSTRACT

An automotive air bag system and a method are provided which restrict activation of an air bag to situations in which the weight of the vehicle occupant meets or exceeds a predetermined amount, e.g., 50 pounds. Occupant weight is determined using a weight pressure sensor positioned underneath the vehicle seat such that it bears pressure from the weight of the seat occupant. The sensor comprises (a) a vessel containing fluid with at least one wall of the vessel defining a first opening; (b) a ram in contact with the fluid, with the ram extending in a substantially linear fashion from the fluid contact inside the vessel to a point outside of the vessel, with the ram capable of being pushed against the fluid contact by the weight of the seat occupant, thereby increasing the fluid pressure; (c) a pressure sensor in fluidic communication with the fluid inside the vessel via a conduit connected to the first opening, with the pressure sensor capable of sensing the fluid pressure, comparing the fluid pressure to a set pressure, and issuing a control signal based upon the comparison; and (d) a switch connected to the pressure sensor for receiving the control signal, with the switch connected in series with the control electronics, the control signal directing the switch to assume either an open state or a closed state and thereby controlling whether the air bag is activated by the control electronics.

17 Claims, 3 Drawing Sheets

CONTROL OF AIR BAG ACTIVATION IN VEHICLES BY OCCUPANCY WEIGHT

BACKGROUND OF THE INVENTION

1 Field of the Invention

The invention relates to air bag restraint systems for automotive vehicles and, more particularly, relates to an apparatus and method for controlling whether an air bag is activated during vehicular operation according to the weight of the vehicle occupant.

2 Description of the Prior Art

Air bags in automotive vehicles serve to protect vehicle occupants in the event of a vehicle impact by supplementing the occupant restraint provided by seat belts. When air bags were first introduced into automobiles, the air bags were typically only employed on the driver's side across from the front seat. However, dual front-seat air bags are now commonplace and, by 1999, all new vehicles will be equipped with dual air bags.

While air bags have proven to save lives and prevent serious injuries in many situations, the explosive nature of their deployment does involve risk to vehicle occupants. In particular, the force of an inflating air bag is known to be potentially deadly to infants in rear-facing seats and may also severely injure older children, causing face and brain injuries. The risk of injury to adults by an inflating air bag is present, albeit less than the risk to children. On balance, the risk of injury to adults from an air bag is generally considered to be less than the risk of injury from vehicular impact, while the reverse may be true for children and infants.

Several approaches have been developed to reduce the risk of air bag-related injuries to children and adults. One general approach involves tailoring the air bag inflation rate and fill pressure to accommodate for different sizes and positions of vehicle occupants. One such system is available from AirBelt Systems LLC under the trade designation IntelliFlow™ Care Bag™. Another general approach has been to deactivate the air bag when the vehicle seat is either unoccupied or occupied by a rear-facing infant seat, such as described in U.S. Pat. No. 5,570,903, issued to Meister et al. and assigned on its face to Echlin, Inc. of Branford, Connecticut.

Meister et al. teach one embodiment in which an array of occupancy sensors is disposed within the passenger-side seat that comprise a plurality of linear Hall effect sensors. Each sensor is positioned beneath a corresponding magnet and provides an electrical output signal that varies as a linear function of proximity to the magnet. The signal may then be analyzed to determine the position and weight of an occupant, if any, and to time the air bag deployment accordingly.

The sensor system of Meister et al. deactivates the air-bag system only if the predetermined vehicle seat position is either (a) unoccupied, as determined by the weight sensor array, or (b) occupied by a rear-facing infant seat, as determined by an optical sensor system. The system of '903 does not deactivate when a small child occupies the predetermined vehicle seat unless the child is in a rear-facing infant seat. Conversely, the sensor system of '903 may be prematurely deactivated if the seat occupant momentarily arises out of the seat, such as during vehicular impact, given the almost instantaneous nature with which its electronic sensors respond to compression and decompression of the seat by an occupant.

There remains a need for an apparatus and a method for discriminating when an air bag should be activated based upon the weight of the vehicle occupant, i.e., allowing the air bag to remain disabled if the vehicle occupant weights less than a predetermined amount. Additionally, the apparatus and method should employ safeguards against the improper deactivation of the air bag upon a momentary shift in weight by the vehicle occupant. The apparatus and method must be reliable and should be relatively inexpensive and easily installed.

SUMMARY OF THE INVENTION

Accordingly, an automotive air bag system and a method are provided which restrict activation of the air bag to situations in which the weight of the vehicle occupant meets or exceeds a predetermined amount. Essentially, the system employs simple hydraulic principles to sense the weight supported by the seat base and, depending on whether the weight is more or less than a predetermined amount, opens or closes a switch in an electronic circuit to control the status of the air bag. Thus, if the detected weight is less than the predetermined amount, a switch in an electronic circuit remains open and the air bag remains deactivated since the electrical current is disrupted. On the other hand, if the detected weight equals or exceeds the predetermined amount, the switch is closed and the completed electronic circuit activates the air bag.

More specifically, the present air bag system includes an air bag positioned within a vehicle opposite a predetermined vehicle seat. The air bag is connected in series with control electronics capable of activating the air bag such that it is ready for deployment in the event of vehicle impact. The system also includes a weight pressure sensor capable of sensing the occupant weight in the predetermined vehicle seat. In one embodiment of the invention, the air bag remains deactivated until the weight pressure sensor detects an occupant weight meeting or exceeding the predetermined weight, at which point the weight switch is closed and the electronic circuit activates the air bag. Thus, the air bag remains deactivated if the seat is unoccupied or occupied by a person weighing less than the predetermined amount.

The weight pressure sensor is positioned underneath the predetermined vehicle seat position such that it bears pressure from the weight of the seat occupant. The sensor comprises:

(a) a vessel containing fluid with at least one wall of the vessel defining a first opening;

(b) a ram in contact with the fluid, with the ram extending in a substantially linear fashion from the fluid contact inside the vessel to a point outside of the vessel, with the ram capable of being pushed against the fluid contact by the weight of the seat occupant, thereby increasing the fluid pressure;

(c) a pressure sensor in fluidic communication with the fluid inside the vessel via a conduit connected to the first opening, with the pressure sensor capable of sensing the fluid pressure, comparing the fluid pressure to a set pressure, and issuing a control signal based upon the comparison; and (d) a switch connected to the pressure sensor for receiving the control signal, with the switch connected in series with the control electronics, the control signal directing the switch to assume either an open state or a closed state and thereby controlling whether the electrical signal is received by the control electronics.

The present air bag system is based upon simple hydraulic principles and is easily manufactured and installed in automobiles, whether by the factory or in the aftermarket.

An important benefit offered by the hydraulic design of the weight pressure sensor is that it provides a safeguard against premature deactivation of the air bag in the event the seat occupant merely shifts weight or momentarily rises out of the seat. The pressure sensor does not instantaneously sense a depressurization in the vessel fluid in response to a decrease in pressure upon the ram by the seat bottom, but rather there is an approximately three-second mechanical delay in pressure sensor response. As such, this delay safeguards against premature deactivation of the air bag during vehicle impact should the vehicle occupant be lifted out of the seat during impact.

DETAILED DESCRIPTION OF THE INVENTION

The present apparatus and method are useful for restricting activation of an automotive air bag system associated with a predetermined seat to situations in which the weight of the seat occupant meets or exceeds a predetermined amount. The present air bag system and method are particularly contemplated for controlling the activation of the passenger-side air bag of the front seat of an automobile.

Figure 1:
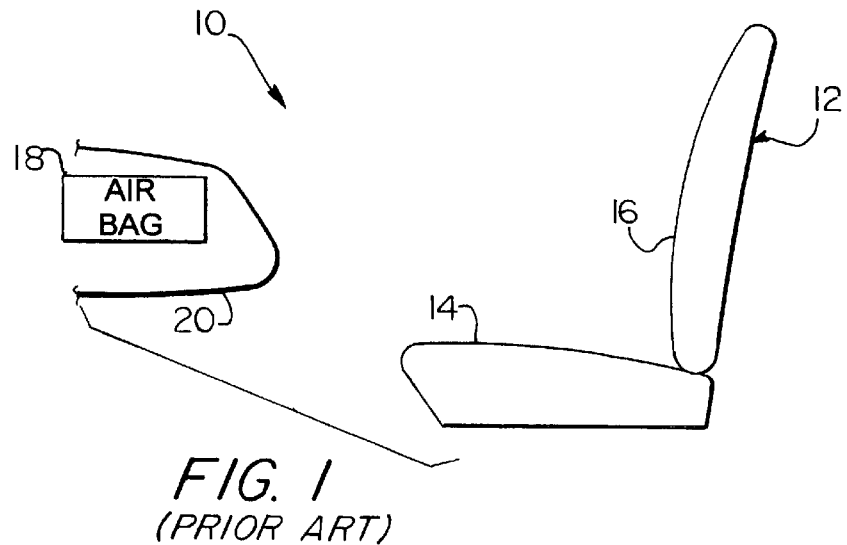
FIG. 1 is a schematic diagram of a prior art passenger-side front-seat air bag system.
Figure 2:
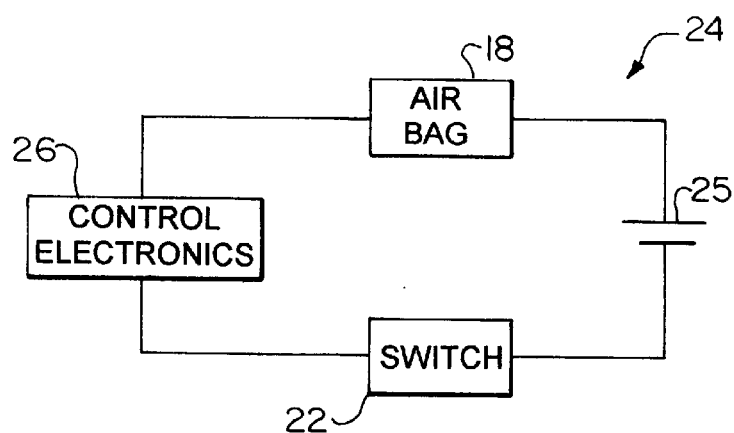
FIG. 2 is a schematic diagram of a prior art electronic circuit employed in an air bag system.

FIG. 1 illustrates the air bag system 10 associated with the passenger side of the front seat 12 of an automobile. The seat 12 has the familiar structure of a horizontal seat base or bench portion 14 and a seat back or back rest portion 16. The air bag 18 (shown in schematic) is disposed in the vehicle dashboard 20 opposite the passenger seat 12 for deployment to protect a passenger seat occupant in the event of vehicle impact. Referring to FIG. 2, an air bag system 10 of a typical automobile is activated upon vehicle ignition, with the act of ignition closing a switch 22 to complete an electronic circuit 24 containing a power source 25, such that a signal is transmitted to control electronics 26 which in turn enables the air bag 18. Impact sensors (not shown) are electronically coupled to air bag 18 in order to initiate inflation of the air bag in the event of a vehicle impact.

Figure 3:
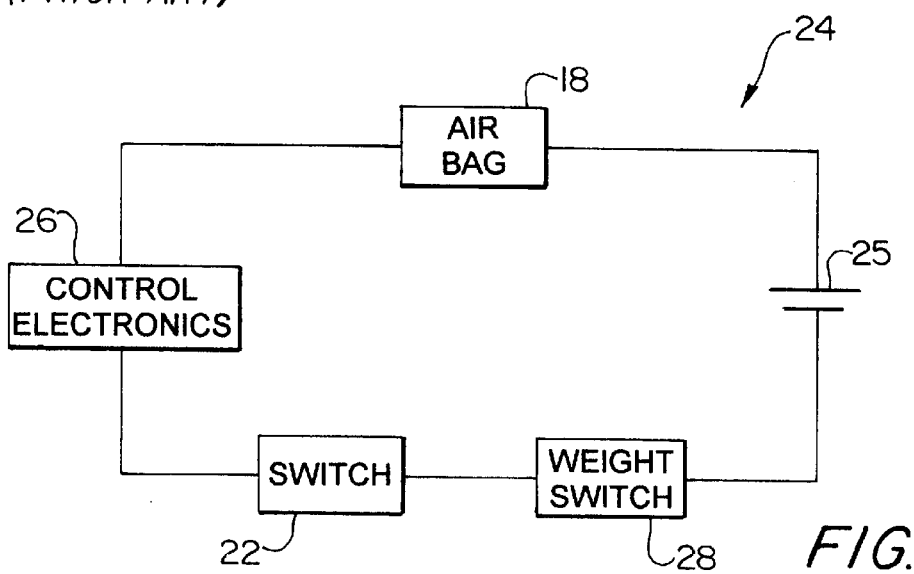
FIG. 3 is a schematic diagram of an electronic circuit in accordance with one embodiment of the present invention.

In the practice of the invention, an occupant-weight switch 28 is connected in series with switch 22 within the electronic circuit 24, as depicted in FIG. 3. The occupant-weight switch 28 normally remains open, thereby disrupting the electronic circuit 24 such that the air bag system 10 is deactivated and will not deploy in the event of a vehicular impact. However, when the weight of the seat occupant supported by seat base 14 is sufficient, the occupant-weight switch 28 is closed, thereby completing the electronic circuit 24 and activating the air bag 18.

Figure 4:
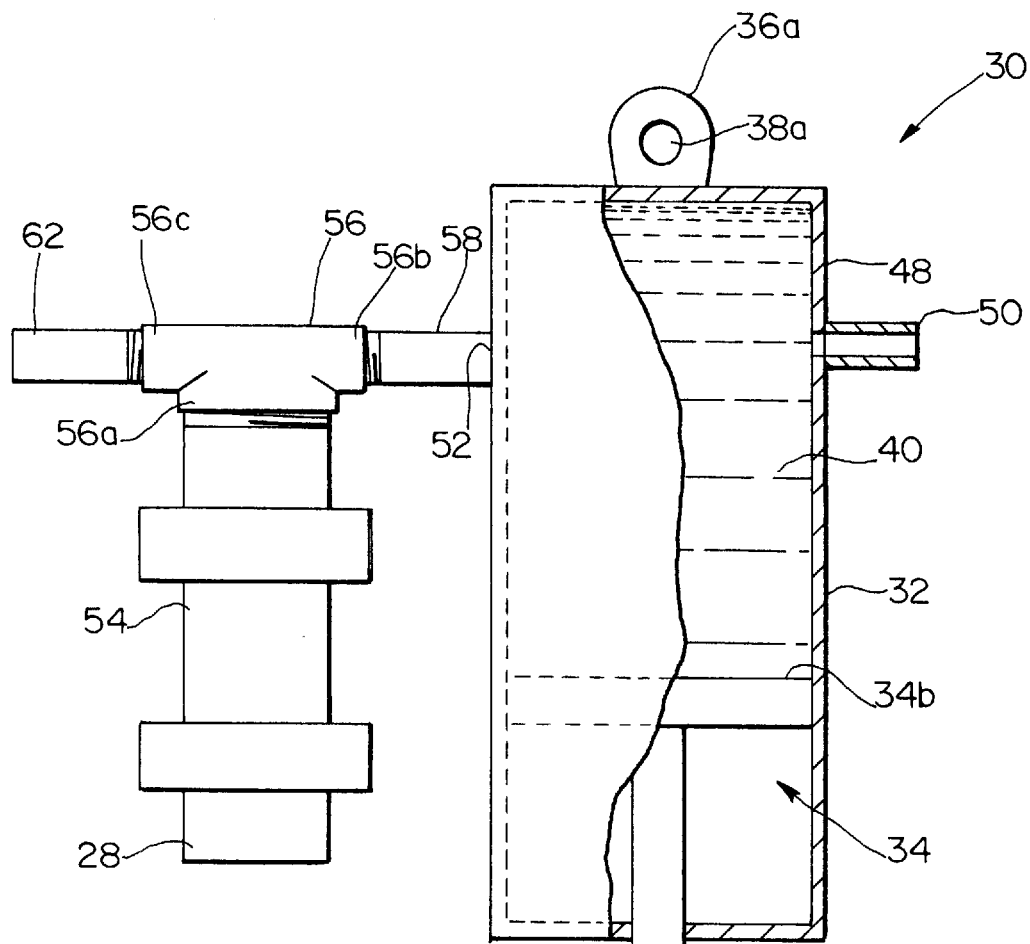
FIG. 4 is an elevational view of the weight pressure sensor in accordance with one embodiment of the present invention.

The occupant-weight switch 28 is controlled by input from a weight pressure sensor 30, depicted in FIG. 4. The weight pressure sensor 30 includes a vessel 32, a ram 34, and attaching lugs 36a,b and holes 38a,b at each end, with the vessel 32 being filled with fluid 40. Essentially, the weight pressure sensor 30 is positioned under the predetermined seat 12 such that the weight of an occupant on the seat base 14 pushes the rod portion 34a of the ram 34, thereby forcing the ram's pressure face 34b deeper into the vessel 32 and further compressing the fluid 40 inside the vessel 32. The fluid pressure is monitored as described below to detect sufficient occupancy weight in the predetermined seat to close the weight switch 28 and activate the air bag 18.

The vessel 32 may assume various shapes and sizes so long as it may be properly installed beneath the bottom of the seat 12 such that the ram 34 will encounter pressure from the weight of a seat occupant. Preferably, the vessel 32 is cylindrical in shape and has a radius of about 1.5 inches (3.8 cm) and a length of about 1 to 4 inches (2.5–10.2 cm).

Figure 5:
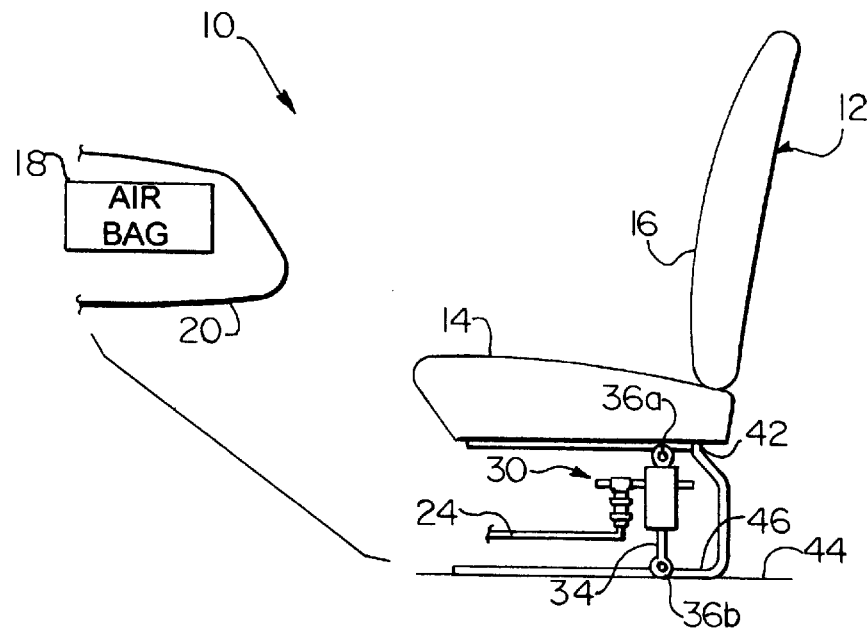
FIG. 5 is a schematic diagram of the weight pressure sensor as installed beneath the seat in accordance with the practice of the invention.

As depicted in FIG. 5, the weight pressure sensor 30 is installed under the seat facing the air bag 18 that is to be controlled in the practice of the invention, typically the passenger side of the front seat 12. Obviously, though, the teachings of the invention are applicable to any passenger seat, front or rear, in a motor vehicle. Specifically, it is preferred that the attaching lug 36a attach on the bottom 42 of the seat itself and that the attaching lug 36b on the ram 34 attach to the vehicle floor 44 or the frame 46 of the seat 12, although the weight pressure sensor 30 may be installed "upside down" such that the ram 34 is coupled to the seat bottom 42. Regardless, it is essential that the weight pressure sensor 30 be positioned such that the weight of a seat occupant will depress the ram 34 and accordingly compress the fluid 40. Most preferably, the attaching lug 36a is mounted in the center of the seat 12 using a slide bracket (not shown).

The fluid 40 serving to pressurize the inside of the cylinder 32 may be any fluid that is substantially non-corrosive and compatible with the materials of the weight pressure sensor 30 contacted thereby. Preferably, a hydraulic fluid is used to pressurize the cylinder 32, such as brake fluid. Another example of a fluid that may be suitably employed in the cylinder includes, but is not limited to, anti-freeze. The initial fluid pressure in the cylinder 32 may be set within a wide range of pressures, with consideration being given to material strengths as well as the desired sensitivity of the sensor 30. However, it is contemplated that the initial fluid pressure will be essentially atmospheric pressure plus the fluid head.

Referring back to FIG. 4, the cylinder 32 is provided with two openings in its fluid-filled end 48: a first opening enables one to bleed pressure as needed from the cylinder 32 through a bleed port 50 by means of a valve (not shown), and the other opening 52 provides for fluidic communication between the fluid 40 in the cylinder 32 and a pressure sensor 54. It is understood that the cylinder 32 could be prefilled at the factory to the appropriate level required for operation with the sensor 30, thereby eliminating the need for the bleed port 50.

Figure 6:
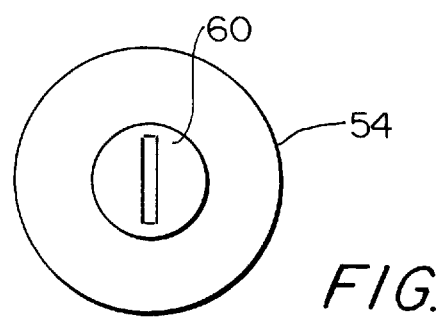
FIG. 6 is a top plan view of the pressure sensor illustrating the location of the adjustment screw that may used to adjust the set point pressure of the weight pressure sensor.

The pressure sensor 54 has a set point pressure such that if it detects fluid pressures in the vessel 32 that are higher or equal to the set point pressure, the pressure sensor 54 directs its associated weight switch 28 to close, thereby completing the electronic circuit 24 and enabling the air bag 18 to deploy upon vehicular impact. The set point pressure is adjustable in some pressure sensors 54 to correspond to weights within the range of about 20 to 200 pounds; however, some pressure sensors 54 are pre-set and cannot be adjusted. Referring to FIG. 6, a top plan view of an adjustable pressure sensor 54 depicts an adjusting dial or screw 60 which may be used to adjust the set point pressure. For example, one may select a set point pressure that corresponds to a weight of 100 pounds, such that the air bag 18 would only be activated for persons weighing at least 100 pounds. Preferably, the set pressure corresponds to an occupant weight within the range of about 50 to 100 pounds, and most preferably to a weight of about 50 pounds, corresponding to the weight of a child old enough to withstand the impact of an inflating air bag.

The pressure sensor 54 employed in the practice of the invention is not limited to any particular type of mechanism, so long as the sensor 54 is capable of providing a signal to close the weight switch 28 upon sensing a pressure equaling or exceeding its own set pressure. Pressure sensors 54 are commercially available with their associated weight switches 28.

The pressure sensor 54 is connected to the vessel 32 via opening 52 in such a manner as to maintain a closed pressure system between the sensor 54 and the vessel 32. Although the invention is not so limited, it is contemplated that a T-shaped fitting 56 is used to connect the pressure sensor 54 to the vessel or cylinder 32, with the T-shaped fitting having threaded ends 56a,b,c. Preferably, the threaded end 56a, which is at right angles to threaded ends 56b,c, is connected to the pressure sensor 54. The threaded ends 56b,c forming the top of the "T" are respectively threaded into a first conduit 58 connected to the opening 52 and into a second conduit serving as a fluid injection port 62 into the cylinder 32. In this fashion, the pressure sensor 54 is placed in pressure communication with the fluid 40 in the cylinder 32.

The fluid injection port 62 is employed to initially charge the vessel 32 with fluid 40 and to add fluid as needed in the practice of the invention. Preferably, the fluid injection port 62 shares access (specifically, opening 52) to the fluid 40 in the vessel 32 with the pressure sensor 54 with the use of a T-fitting. However, a third opening (not shown) in the vessel 32 may be provided that is dedicated to the fluid injection port 62.

The weight pressure sensor 30 as described above is therefore responsive to the weight of the seat occupant. In operation, a person sitting in seat 12 pushes the ram 34 into the vessel 32 such that the fluid pressure increases. The pressure sensor 54 registers the fluid pressure and, if the fluid pressure equals or exceeds its set pressure, the pressure sensor 54 will cause the weight switch 28 to close, thereby completing the electronic circuit 24, allowing current to flow, and activating the air bag 18. If the pressure placed on the ram 34 by the occupant is less than the set pressure in the pressure sensor 54, the weight switch 28 will remain open, the electronic circuit 24 will not be completed, and the air bag 18 will remain deactivated.

The use of a hydraulic weight-sensing device in the present invention offers an important advantage over electronic/magnetic weight-sensing systems, such as disclosed by Meister et al. in U.S. Pat. No. 5,570,903. In a system in which the occupancy sensors detect and transmit weight changes borne by the seat 12 using electrical signals, such changes are transmitted almost instantaneously. Therefore, if the occupant of seat 12 should momentarily arise or be lifted from the seat 12, such as prior to vehicle impact, the electrical signals from an electronic weight-sensing device would almost instantaneously direct the weight switch to close, thereby disabling the air bag 18 when needed most. A hydraulic-weight sensing device in accordance with the practice of the invention does not evoke such concerns.

The present hydraulic-weight sensing device reacts more slowly and deliberately to changes in pressure on the seat 12.

Specifically, there is an approximately three-second delay between the actual occurrence of a pressure change against the seat 12 and the detection of the pressure change by the pressure sensor 54. In other words, the fluid 40 inside the cylinder 32 does not immediately de-pressurize in response to a decrease in pressure upon the ram 34 by the seat bottom 42. In comparison, an air bag typically deploys in one twelve-thousands ($1/12,000$) of a second. Thus, the hydraulic system of the present invention is safeguarded from prematurely deactivating the air bag 18 in the event, e.g., an adult seat occupant arises out of the seat during an accident. This is an improvement over electrical weight-sensing devices, which could conceivably react to seat pressure quickly enough to prematurely deactivate the air bag 18 before its deployment in the event of vehicular impact.

Figure 7:
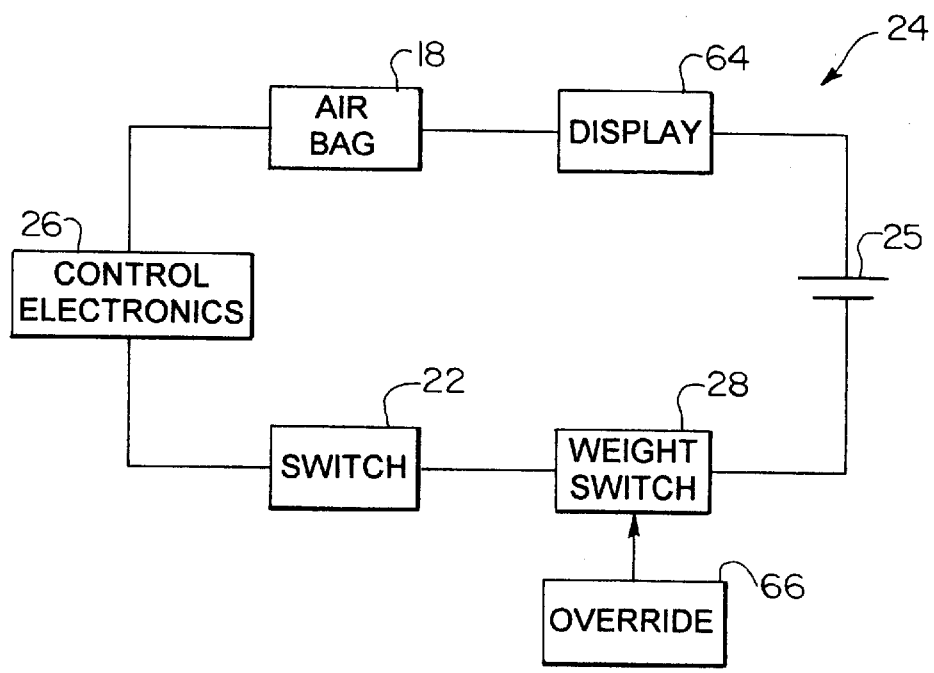
FIG. 7 is a schematic diagram of an electronic circuit in accordance with a preferred embodiment of the present invention.

As depicted in FIG. 7, control electronics 26 is preferably connected in series with a vehicle operator display 64 for advising the vehicle operator regarding whether the air bag 18 is activated. The vehicle operator display 64 may be mounted on the vehicle dashboard 20. An override switch 66 also may be provided to permit the vehicle operator to override the occupant-weight switch 28 so that the air bag system is either always enabled or disabled regardless of the weight of the occupant.

The present air bag system 10 may be installed in a vehicle at the time of original manufacture, or as an after-market accessory. It is an easily implemented and relatively inexpensive means to confine the use of air bags to the protection of persons of sufficient size and weight to safely withstand their deployment force.

Thus, there has been disclosed herein an apparatus and a method or hydraulically controlling the activation of vehicular air bags in accordance with the weight of vehicle occupants. It will be readily apparent to those skilled in the art that various changes and modifications of an obvious nature may be made without departing from the spirit of the invention, and all such changes and modifications are considered to fall within the scope of the invention as defined by the appended claims.

We claim:

1. A weight pressure sensor device for controlling the operation of an air bag system for use in automotive vehicles, said air bag system comprising an air bag positioned within a vehicle opposite a predetermined vehicle seat position, said air bag being coupled to inflation means activated by control means for deploying the air bag in the event of vehicle impact, said device comprising:

(a) compressible means connected to said vehicle seat for registering a weight pressure exerted on said seat, said compressible means including a vessel containing a fluid adapted to flow in response to said weight pressure exerted on said seat;

(b) sensor means coupled to said compressible means for sensing said weight pressure registered by said compressible means with reference to a predetermined pressure setpoint, said predetermined pressure setpoint being adjustable; and (c) switch means coupled to said sensor means for enabling said air bag system when said weight pressure sensed by said sensor means is at least equal to said predetermined pressure setpoint.

2. A weight pressure sensor device for controlling the operation of an air bag system for use in automotive vehicles, said air bag system comprising an air bag positioned within a vehicle opposite a predetermined vehicle seat position, said air bag being coupled to inflation means activated by control means for deploying the air bag in the event of vehicle impact, said device comprising:

(a) compressible means connected to said vehicle seat for registering a weight pressure exerted on said seat, said compressible means including a ram and cylinder combination, said compressible means including a vessel containing a fluid adapted to flow in response to said weight pressure exerted on said seat;

(b) sensor means coupled to said compressible means for sensing said weight pressure registered by said compressible means with reference to a predetermined adjustable pressure setpoint; and (c) switch means coupled to said sensor means for enabling said air bag system when said weight pressure sensed by said sensor means is at least equal to said predetermined pressure setpoint.

3. The device of claim 2, further including a vehicle operator display for indicating whether said inflation means is activated.

4. The device of claim 2, further including a manual override switch to enable said air bag system independently of said weight pressure sensed by said sensor means.

5. The device of claim 2, wherein there is a predetermined time delay between the removal of said weight pressure exerted on said seat and said switch means returning said air bag system to its pre-enabled state.

6. The device of claim 2, wherein said compressible means consists of a ram and cylinder combination; said cylinder containing a hydraulic fluid having a pressure; said ram being in contact with said fluid and being capable of being pushed by said weight pressure exerted on said seat, to thereby increase said fluid pressure; said sensor means being in fluidic communication with said fluid inside said cylinder via a conduit connected thereto, said sensor means being capable of sensing said fluid pressure, comparing said fluid pressure to said predetermined pressure setpoint and issuing a control signal based upon said comparison; and wherein said device further includes a vehicle operator display for indicating whether said inflation means is activated, and a manual override switch to enable said air bag system independently of said weight pressure sensed by said sensor means, wherein there is a predetermined time delay between the removal of said weight pressure exerted on said seat and said sensor means issuing a further control signal based upon said comparison.

7. A weight pressure sensor device for controlling the operation of an air bag system for use in automotive vehicles, said air bag system comprising an air bag positioned within a vehicle opposite a predetermined vehicle seat position, said air bag being coupled to inflation means activated by control means for deploying the air bag in the event of vehicle impact, said device comprising:

(a) compressible means connected to said vehicle seat for registering a weight pressure exerted on said seat, said compressible means including a ram and cylinder combination, said cylinder containing a fluid having a pressure, said ram being in contact with said fluid and being capable of being pushed by said weight pressure exerted on said seat to thereby increase said fluid pressure, said compressible means including a vessel containing a fluid adapted to flow in response to said weight pressure exerted on said seat;

(b) sensor means coupled to said compressible means for sensing said weight pressure registered by said compressible means with reference to a predetermined pressure setpoint, said sensor means being in fluidic communication with said fluid inside said cylinder via a conduit connected thereto, said sensor means being capable of sensing said fluid pressure, comparing said fluid pressure to said predetermined pressure setpoint and issuing a control signal based upon said comparison; and (c) switch means coupled to said sensor means for enabling said air bag system when said weight pressure sensed by said sensor means is at least equal to said predetermined pressure setpoint.

8. A weight pressure sensor device for controlling the operation of an air bag system for use in automotive vehicles, said air bag system comprising an air bag positioned within a vehicle opposite a predetermined vehicle seat position, said air bag being coupled to inflation means activated by control means for deploying the air bag in the event of vehicle impact, said device comprising:

(a) compressible means connected to said vehicle seat for registering a weight pressure exerted on said seat, said compressible means including a vessel containing a fluid adapted to flow in response to said weight pressure exerted on said seat;

(b) sensor means coupled to said compressible means for sensing said weight pressure registered by said compressible means with reference to a predetermined adjustable pressure setpoint, said predetermined adjustable pressure setpoint corresponding to an occupant weight within the range of 50 and 100 pounds; and (c) switch means coupled to said sensor means for enabling said air bag system when said weight pressure sensed by said sensor means is at least equal to said predetermined adjustable pressure setpoint.

9. A weight pressure sensor device for controlling the operation of an air baa system for use in automotive vehicles, said air bag system comprising an air bag positioned within a vehicle opposite a predetermined vehicle seat position, said air bag being coupled to inflation means activated by control means for deploying the air bag in the event of vehicle impact, said device comprising;

(a) compressible means connected to said vehicle seat for registering a weight pressure exerted on said seat, said compressible means including a vessel containing a fluid adapted to flow in response to said weight pressure exerted on said seat, said fluid being hydraulic fluid;

(b) sensor means coupled to said compressible means for sensing said weight pressure registered by said compressible means with reference to a predetermined adjustable pressure setpoint; and (c) switch means coupled to said sensor means for enabling said air bag system when said weight pressure sensed by said sensor means is at least equal to said predetermined adjustable pressure setpoint.

10. A weight pressure sensor device for controlling the operation of an air bag system for use in automotive vehicles, said air bag system comprising an air bag positioned within a vehicle opposite a predetermined adjustable vehicle seat position, said air bag being coupled to inflation means activated by control means for deploying the air bag in the event of vehicle impact, said device comprising;

(a) compressible means connected to said vehicle seat for registering a weight pressure exerted on said seat, said compressible means including a vessel containing a fluid adapted to flow in response to said weight pressure exerted on said seat;

(b) sensor means coupled to said compressible means for sensing said weight pressure registered by said compressible means with reference to a predetermined adjustable pressure setpoint; and (c) switch means coupled to said sensor means for enabling said air bag system when said weight pressure sensed by said sensor means is at least equal to said predetermined adjustable pressure setpoint, wherein there is a predetermined adjustable time delay between the removal of said weight pressure exerted on said seat and said switch means returning said air bag system to its pre-enabled state, said predetermined adjustable time delay being at least one second.

11. An air bag system for use in automotive vehicles, said air bag system including an air bag positioned within a vehicle opposite a front passenger seat, said air bag being connected with control electronics that activate said air bag upon receipt of an electrical signal from a power source such that said air bag inflates in the event of vehicle impact, said air bag system further including a weight pressure sensor device to sense the weight of an occupant of said front passenger seat and to control whether said electrical signal is received by said control electronics based upon said weight, said weight pressure sensor device comprising:

(a) a cylindrical vessel containing hydraulic fluid and having a wall and an end, said wall defining a first opening in the vessel, said hydraulic fluid having a pressure;

(b) a ram in contact with said hydraulic fluid, said ram extending in a substantially linear fashion from said fluid contact inside said vessel to a point outside said vessel, wherein said ram is capable of being pushed against said fluid contact by the weight of said occupant of the front passenger seat, thereby increasing said fluid pressure;

(c) a pressure sensor in fluidic communication with said hydraulic fluid inside said vessel via a conduit connected to said first opening, said pressure sensor being capable of sensing said fluid pressure, comparing said fluid pressure to a set pressure and issuing a control signal if said fluid pressure equals or exceeds said set pressure; and (d) a switch connected to said pressure sensor for receiving said control signal, said switch being connected in series with said control electronics, said control signal directing said switch to close such that said electrical signal is received by the control electronics and said air bag is activated.

12. The device of claim 11, wherein there is a predetermined time delay between the removal of said weight of an occupant on said front passenger seat and said pressure sensor issuing a further control signal.

13. A method for controlling whether an air bag for use in automotive vehicles is activated based upon vehicle occupancy weight, said air bag being positioned within a vehicle opposite a predetermined vehicle seat position, and being coupled to inflation means activated by control means for deploying said air bag in the event of vehicle impact, said method comprising the steps of:

(a) connecting compressible means to said vehicle seat for registering a weight pressure exerted on said seat, said compressible means including a vessel containing a fluid adapted to flow in response to said weight pressure exerted on said seat;

(b) sensing said weight pressure with reference to a predetermined adjustable pressure setpoint using a sensor means coupled to said compressible means for sensing said weight pressure registered by said compressible means; and (c) enabling said air bag system when said weight pressure sensed by said sensor means is at least equal to said predetermined adjustable pressure setpoint.

14. The method of claim 13, further comprising the step of providing a vehicle operator display for indicating whether said inflation means is activated.

15. The method of claim 13, further comprising the step of providing a manual override switch to enable said air bag system independently of the weight pressure sensed by the sensor means.

16. The method of claim 13, further comprising the step of providing a predetermined time delay between the removal of said weight pressure exerted on said seat and returning said air bag system to its pre-enabled state.

17. The method of claim 16, further comprising the step of providing a vehicle operator display for indicating whether said inflation means is activated.

* * * * *